United States Patent [19]

Wilson

[11] Patent Number: 4,509,024

[45] Date of Patent: Apr. 2, 1985

[54] IMPEDANCE BOND

[75] Inventor: H. James Wilson, LaGrange, Ky.

[73] Assignee: Safetran Systems Corporation, Louisville, Ky.

[21] Appl. No.: 461,105

[22] Filed: Jan. 26, 1983

[51] Int. Cl.[3] .......................... H03H 7/01; H03H 7/09

[52] U.S. Cl. .................................... 333/24 R; 246/37; 333/132; 333/176; 333/177; 333/185

[58] Field of Search ................................ 333/167–168, 333/177, 185, 1, 4, 5, 24 R, 100, 129, 132, 176, 24 C; 336/192, 213; 307/72–73; 246/35–37

[56] References Cited

U.S. PATENT DOCUMENTS

| | | | |
|---|---|---|---|
| Re. 14,774 | 12/1919 | Fortescue | 333/175 X |
| 1,304,294 | 5/1919 | Fortescue | 246/37 |
| 1,439,680 | 12/1922 | Anderson et al. | 246/37 |
| 3,477,051 | 11/1969 | Clark et al. | 336/192 X |
| 3,496,506 | 2/1980 | Seidel et al. | 336/213 X |

FOREIGN PATENT DOCUMENTS

| | | | |
|---|---|---|---|
| 832510 | 4/1960 | United Kingdom | 246/37 |

*Primary Examiner*—Marvin L. Nussbaum

*Attorney, Agent, or Firm*—Kinzer, Plyer, Dorn & McEachran

[57] ABSTRACT

An impedance bond for use in an electrified railway to provide a path for traction current includes a housing and a core positioned within the housing. The core is formed of a band of silicon steel wound into a closed loop construction which is then severed to form a cap and a U-shaped body. A pair of coils are positioned each upon a leg of the U-shaped core prior to repositioning the cap upon the core. Each of the coils is substantially identical in electrical resistance and each is formed of a flat copper sheet, identical in length, and wound into coils identical in configuration. There are terminal straps attached to the coil which extend outwardly from the housing. The terminal straps are preferably cast copper.

4 Claims, 3 Drawing Figures

30
34
38
36
36
40
40
42
43
43

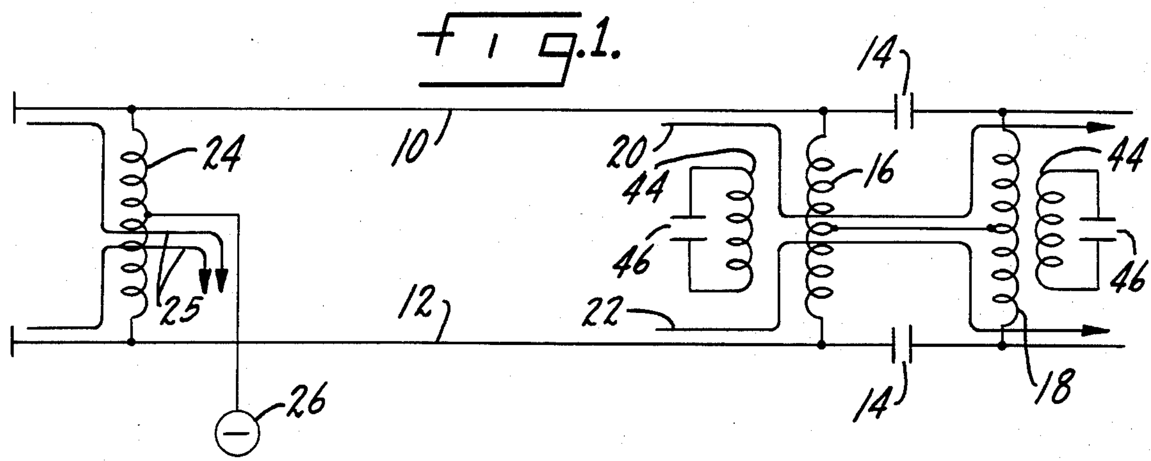
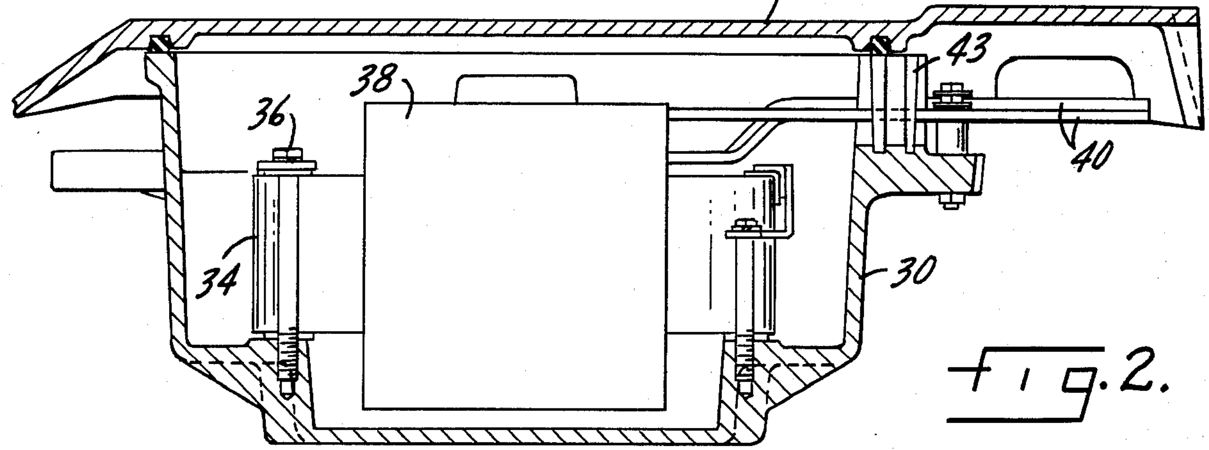
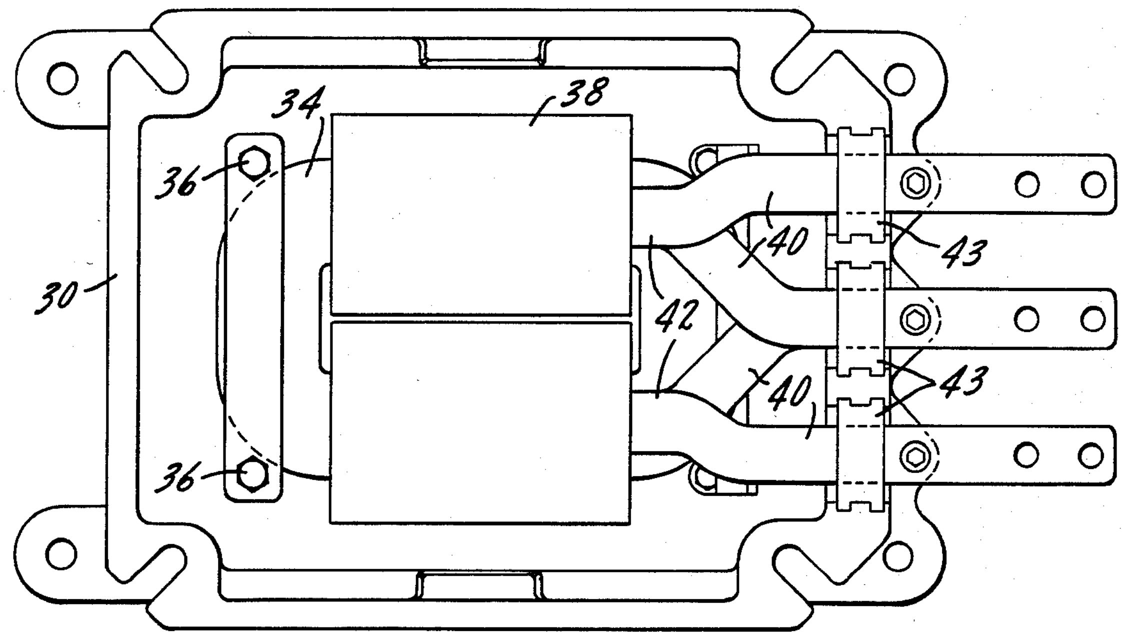
Fig.3.

IMPEDANCE BOND

SUMMARY OF THE INVENTION

The present invention relates to impedance bonds and particularly the type used on an electrified railway to provide a connection between insulated rails for traction or propulsion current. Normally an electrified railway will be divided into blocks, for signal current purposes. The present invention is specifically directed to a means for bypassing the insulated joint between signal blocks to carry traction current back to a substation.

A primary purpose of the invention is an impedance bond of the type described which is simple in construction, reliably operable, and can be manufactured at a substantially lower cost than impedance bonds currently available on the market.

Another purpose is an impedance bond in which the coils positioned upon the core are identical in electrical resistance.

Another purpose is an impedance bond of the type described in which the terminal straps extending outwardly therefrom are cast copper.

Another purpose is an impedance bond of the type described which includes a secondary winding on the core and a capacitor connected thereacross to form a tuned resonant circuit for isolating signal currents.

Another purpose is an impedance bond of the type described in which the core and coils are formed of standard components.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a portion of an electrified railway showing the use of impedance bonds thereon, FIG. 2 is a side view, in section, illustrating an impedance bond of the type described, and FIG. 3 is a top view of the impedance bond of FIG. 2 with the cover removed.

DESCRIPTION OF THE PREFERRED EMBODIMENT

An impedance bond is used in an electrified railway as a means for providing a connection between insulated rails so that the propulsion or traction current can be passed from one insulated rail section to the next. The passage of signal current is blocked by the insulation between rail sections and the impedance bond provides a means for assuring continuity of the traction current path. It is most important in the use of impedance bonds that the coils be equal in resistance, as otherwise there is an imbalance in the propulsion current flow through the impedance bond which in turn causes the impedance bond core to be saturated with the result that the reactance of the impedance bond coil becomes quite low, providing an effective short circuit between the rails for signal current. Thus, it is of significant importance that the resistance of the coils in the impedance bond be equal.

In impedance bonds currently available on the market, in order to make the coils of equal resistance, it is necessary that they be wound in what is called a bifilar manner or that the coils be wound simultaneously. This is an expensive operation and one which necessitates the use of substantial and expensive equipment. Further, the cores in present day impedance bonds are either an EE or EI configuration and in each case the core is formed of a stack of laminations which are die cut to a specific shape. Such laminations, in order to form the core, must then be precisely stacked, the assembly process again being substantially expensive.

The present invention provides an impedance bond in which the components may be generally of a standard nature, but which heretofore have not been assembled in the precise environment and for the specific use described. The core and coil, although not new per se, heretofore have not been combined in the particular arrangement disclosed to form an impedance bond in an electrified railway. Specifically, the coils may be wound one at a time because they are formed of a copper sheet of a predetermined length which is wound into a coil on a particular mandrel configuration. The core is formed from a steel strap, for example 3 percent silicon steel, and is wound into a closed loop as is conventional in transformer core configurations. It is the combination of these elements, in the precise configurations shown and for the specific utility described, which provides an impedance bond of excellent operating characteristics and one which can be made at a substantial cost reduction.

In FIG. 1, a pair of rails are indicated at 10 and 12 and illustrate an insulated section of railroad track in an electrified railway. An insulated rail gap is indicated at 14. In order to bridge gap 14, two impedance bonds, indicated at 16 and 18, are connected together. The path of traction or propulsion current is indicated by the arrows 20 and 22.

At the opposite end of the insulated rail section there is a single impedance bond 24 which has its center tap connected to a substation diagrammatically illustrated at 26. It is conventional in electrified railways to have the positive side of the electrical power supplied from either catenary wires or from a third rail. The rails themselves then provide the current return path and normally the substation is connected to the rails through an impedance bond as diagrammatically illustrated at the path of current flow indicated by arrows 25 and 26. Impedance bonds may be used in two ways, to form a connection between insulated rail arteries, and as a connection to an external source of power.

The impedance bond per se is illustrated in FIGS. 2 and 3. There may be a housing 30 which is preferably of cast iron construction and is commonly referred to as a tub. Tub 30 may have a cover 32, illustrated in FIG. 2, which will cover the core and coil combination.

Positioned within tube 30 is a core 34 which is formed of a steel strap, for example a 3 percent silicon steel strap, and is initially wound into a closed loop configuration. In the manufacture of the impedance bond, once the core is wound it is then severed into a cap and a body portion with the body having U-shaped legs to support the coils. For example, The Arnold Engineering Co. of Marengo, Ill., manufactures a core of this configuration. Bolts or other fastening means indicated at 36 in FIGS. 2 and 3 are used to securely fasten the core within tub 30.

Positioned on each leg of the core is a coil 38. The coils 38 are identical in resistance and are each formed from the exact same length of flat copper sheet with interleaved insulation, for example paper or the like. The coils are each wound on an identical mandrel so that the final coil electrical characteristics are identical. In this way there is no imbalance in resistance between the coils. After the coils have been so formed, they are positioned upon the legs of the core and then the cap of the core is positioned back upon the body, either with an air gap or without, depending upon whether it is for an AC or DC traction system.

In a DC propulsion system there will be a small air gap between the mating faces of the core. In an AC propulsion system such an air gap is not required. In all other respects the impedance bonds are the same. An AC impedance bond will be much smaller in size than a DC impedance bond for the same current rating and this is because the AC impedance bond does not have an air gap, whereas the DC impedance bond utilizes such a construction.

Extending outwardly from coils 38 are a plurality of terminal straps 40 which, as illustrated specifically in FIG. 3, have a number of severe bends, one of which is indicated at 42. It is preferred that the terminal straps 40 be of cast copper. In prior constructions the necessity for having the terminal straps make substantial bends in order to extend outwardly from tub 30 has created substantial stress concentrations at the bend areas. Such stress concentrations in turn create areas which are subject to overheating. By casting the copper terminal straps into the precise desired configuration, all stress concentrations are eliminated, as are problems with areas of high heat. Insulation 43 may enclose each copper strap where it passes through the tub.

Returning to FIG. 1, a secondary coil 44 is shown positioned in association with impedance bonds 16 and 18. Each of the secondary coils will be wound upon the core, but otherwise not electrically connected to the rails. Across each of the secondary coils there is a capacitor 46. In effect, the secondary coil and its associated capacitor provides an LC tuned circuit. In electrified railways where there is only a single signal current frequency, for example in an electrified subway, it is possible to provide the tuned circuit shown which will be resonant at the frequency of signal current. Such a resonant tuned circuit provides a very high impedance to the passage of signal current between impedance bonds which makes it possible to reduce the number of turns in the main coils of the impedance bond, thus lowering its cost. Such an arrangement is only feasible with a core which has a very high Q and this is the type of core described above, namely one formed of a wound steel strap. Cores formed of stacked laminations do not have nearly the same Q as one formed of wound steel strap and thus are not susceptible to the same advantageous use of the secondary tuned circuit.

It is important in an impedance bond to ensure that the structure remains temperature stable. To this end normally an oil will fill the tube to maintain the temperature of the impedance bond. By utilizing coils of the same resistance it is possible to predict temperatures and to provide appropriate engineering and design parameters to control heat. When the coils have unequal resistance there will be hot spots within the impedance bond and such hot spots normally require special design arrangements to accommodate the heat, which special construction arrangements often add substantial cost to the overall construction. It is known in transformer and impedance bond constructions that there will be substantial heat. However, the present invention, because of the equality of the resistance and other parameters of the coils permit engineers to accurately, efficiently and at low cost control or dissipate the heat. If there is an unbalance, such unbalance will cause hot spots which in turn require special design considerations.

In prior impedance bond constructions, the coils were formed of heavy and thick copper bars. The present coil utilizes a 50 mil thick copper sheet which is substantially simpler to wind into a coil of known configuration.

Whereas the preferred form of the invention has been shown and described herein, it should be realized that there may be many modifications, substitutions and alterations thereto.

The embodiments of the invention in which an exclusive property or privilege is claimed are defined as follows:

1. An impedance bond for use in an electrified railway to provide a path for traction current including a housing, a core within said housing, said core being formed of a band of silicon steel wound into a closed loop construction which is severed to form a cap and a U-shaped body to permit coil placement thereon, a pair of coils positioned each upon a leg of the U-shaped core, each of said coils being substantially identical in electrical resistance and each being formed of a flat copper sheet, identical in length, and wound into coils identical in configuration, and terminal straps attached to said coils and extending outwardly from said housing.

2. The impedance bond of claim 1 further characterized in that said housing is closed and contains a cooling medium therein.

3. The impedance bond of claim 1 further characterized in that said terminal straps are cast copper.

4. The impedance bond of claim 1 further characterized by and including a secondary winding on said core and a capacitor connected across said secondary winding to form a tuned circuit therewith, said tuned circuit being formed and adapted to be resonant at a predetermined frequency, normally the same as the signal frequency to be used on an electrified railway.

* * * * *